United States Patent [19]
Koide et al.

[11] Patent Number: 6,094,303
[45] Date of Patent: Jul. 25, 2000

[54] BINOCULARS

[75] Inventors: Wataru Koide, Hachioji; Fumio Tomikawa, Sagamihara; Tatsuya Suzuki, Tokyo; Yuichi Torikoshi, Kanagawa, all of Japan

[73] Assignee: Olympus Optical Co., Ltd., Tokyo, Japan

[21] Appl. No.: 09/318,359

[22] Filed: May 25, 1999

[30] Foreign Application Priority Data

May 28, 1998 [JP] Japan .................................. 10-148040

[51] Int. Cl.[7] .................................................. G02B 23/00
[52] U.S. Cl. .......................... 359/407; 359/227; 359/419; 359/480; 359/507; 359/511; 359/600; 33/244
[58] Field of Search ..................................... 359/227, 407, 359/419, 480–481, 511, 507, 611, 600; 33/244

[56] References Cited

U.S. PATENT DOCUMENTS

5,631,772  5/1997  Mizukawa ............................. 359/511

*Primary Examiner*—Cassandra Spyrou
*Assistant Examiner*—Craig Curtis
*Attorney, Agent, or Firm*—Ostrolenk, Faber, Gerb & Soffen, LLP

[57] ABSTRACT

Binoculars include a pair of lens barrels, each barrel having an optical system, a flexible lens barrier which travels between a protective position for protecting the optical system of each of the lens barrels and a position that is retracted from the field of view of the optical system, and a drive member for moving the flexible lens barrier between the protective position and the retracted position.

17 Claims, 8 Drawing Sheets

PRIOR ART

FIG.11

PRIOR ART

BINOCULARS

BACKGROUND OF THE INVENTION

1. Field of the Invention

The present invention relates to binoculars, and, more particularly, binoculars having a lens barrier for protecting an optical lens.

2. Related Art Statement

The human eye spacing, namely, the human inter-pupillary distance, varies considerably, depending on age, sex, and from person to person. To accommodate such variation, Japanese Unexamined Patent Publication No. 8-36135 discloses binoculars having a mechanism that adjusts the distance between a pair of lens barrels to accommodate users having a wide range of the inter-pupillary distance.

The above-mentioned binoculars have an eye spacing adjustment capability to change the relative position between a pair of lens barrels. Generally, the binoculars are kept with the spacing between their lens barrels narrowed in a closed state. During use, the spacing between the lens barrels is widened while the eye spacing adjustment is made at the same time. For example, Japanese Unexamined Patent Publication No. 8-36135 discloses binoculars having such an eye spacing adjustment capability.

The binoculars disclosed in Japanese Unexamined Patent Publication No. 8-36135 provides a lens barrier which is interlocked with the barrel spacing adjustment of barrels and protects each optical system of the lens barrels. The lens barrier substitutes for conventional lens caps, and serves as a protector for an objective lens unit and an eyepiece lens unit when the binoculars are in the closed state. When the binoculars are in the closed state, the lens barrier is moved to a position to cover the objective lens unit and the eyepiece lens unit, thereby protecting the lens units. During use, i.e., during eye spacing adjustment, the lens barrier is retracted from the lens units.

Among known binoculars of the type in which an optical system including an objective lens and an eyepiece lens is moved along the optical axis in response to the eye spacing adjustment of the lens barrels, some project the lens barrels, including the optical system, out of the body of the binoculars along the optical axis.

Figure 10:
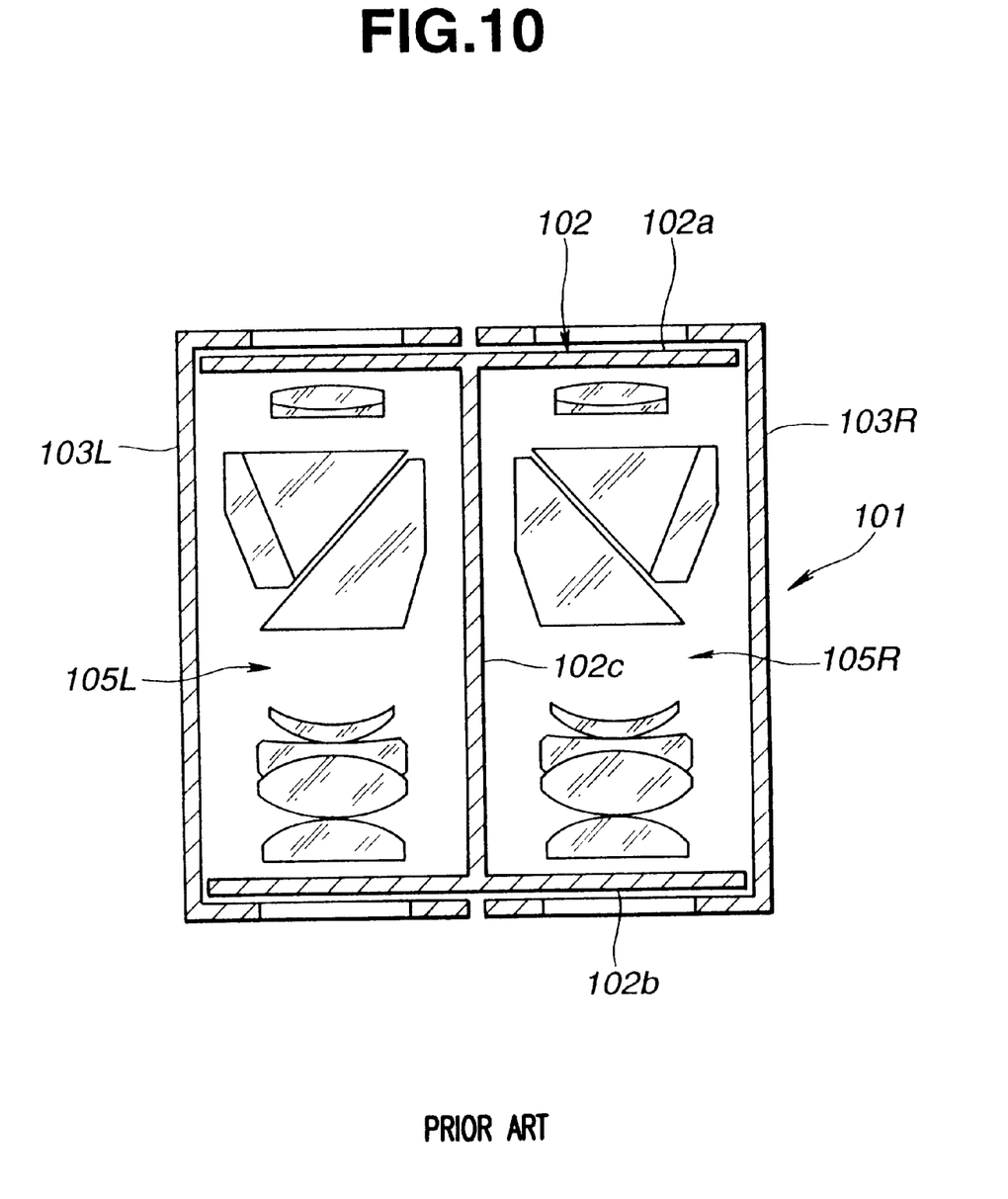
FIG. 10 is a longitudinal cross-sectional view showing internal critical components of conventional binoculars in a closed state, in which the top portion has been cut away.
Figure 11:
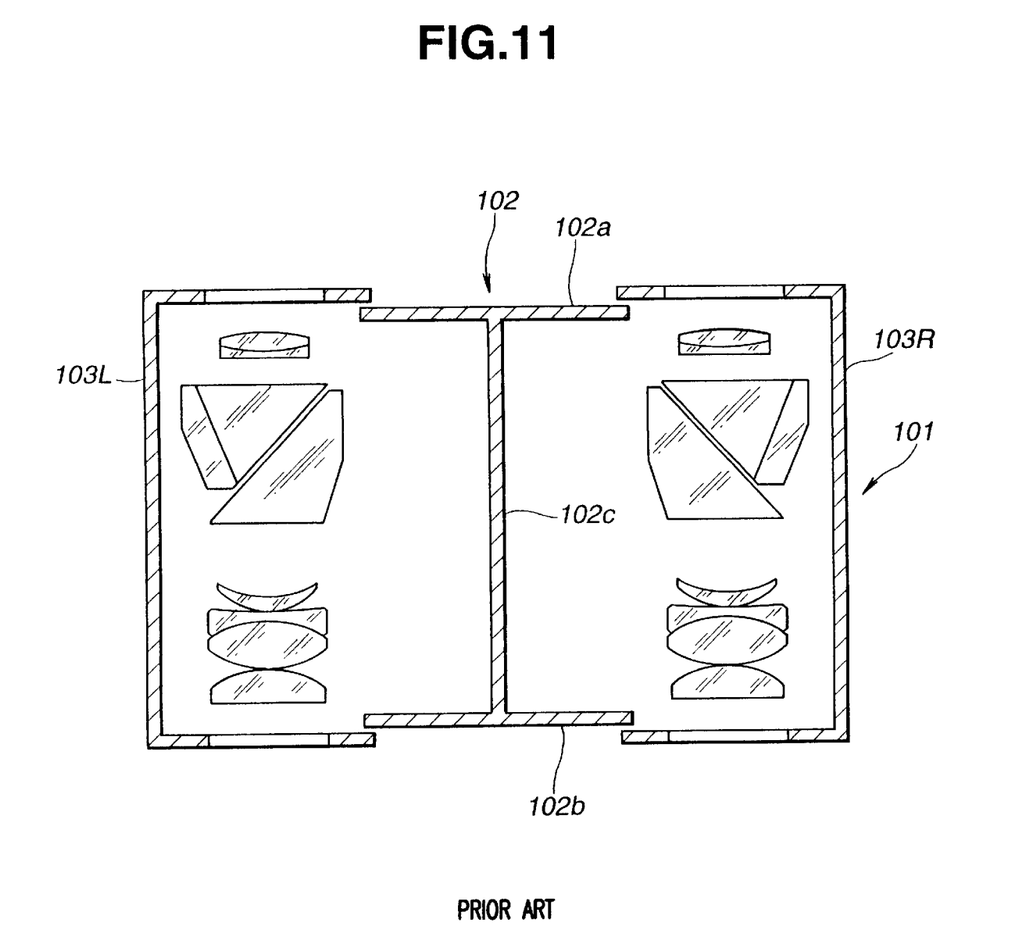
FIG. 11 is a longitudinal cross-sectional view showing the internal critical components of the conventional binoculars in an operational state, in which the top portion has been cut away.

Referring to FIG. 10 and FIG. 11, one example of such binoculars is discussed. Binoculars 101 shown in FIG. 10 and FIG. 11 include a pair of lens barrels 103R and 103L having a pair of optical systems 105R and 105L, respectively. Each of the optical systems 105R and 105L has a pair of objective and eyepiece optical systems. The distance between the optical axes of the optical systems of the lens barrels 103R and 103L is adjustable, and the eye spacing adjustment is thus possible. FIG. 10 shows a closed state in which the lens barrels 103R and 103L are spaced by a minimum spacing. FIG. 11 shows that the lens barrels 103R and 103L are spaced by a maximum spacing.

In their body, the binoculars 101 includes an lens barrier member 102 that protects the objective optical system and the eyepiece optical system. The lens barrier member 102 includes a first barrier 102a that is moved to a position to cover the objective optical system when the binoculars 101 are in the closed state, a second barrier 102b that is moved to a position to cover the eyepiece optical system when the binoculars 101 are in the closed state, and a barrier connection member 102c for connecting the first barrier 102a and the second barrier 102b at their front and rear points.

Since the lens barrier member 102 also serves as the external housing of the binoculars 101, the lens barrier member 102 is affixed to the body of the binoculars, and their exposed portions, namely, the first barrier 102a and the second barrier 102b are planar.

Referring to FIG. 10, when the binoculars 101 are in the closed state, an objective lens and an eyepiece lens are respectively covered with the first barrier 102a and second barrier 102b of the lens barrier member 102.

When the binoculars 101 are in an operational state, i.e., when the spacing between the lens barrels 103R and 103L is widened to a maximum spacing as shown in FIG. 11, the first barrier 102a and second barrier 102b are retracted from their respective optical systems, and the fields of view are thus enabled.

As is the case with the binoculars disclosed in the Japanese Unexamined Patent Publication No. 8-36135, the binoculars having the above-referenced lens barrier suffers from the following problems.

Since the barrier member itself is made of a non-deformable material, space for retracting it is required. This affords designers less flexibility in the design of the binoculars and difficulty in the production of compact designs.

Moreover, when the lens barrier is in the retracted state, namely, during use, the binoculars offers no receiving space for the nose of the user.

OBJECTS AND SUMMARY OF THE INVENTION

It is a first object of the present invention to provide binoculars that reliably perform a lens protection function, enable the fields of view with a simple operation during use, and affords a high degree of design flexibility with a space saving feature.

It is a second object of the present invention to provide binoculars that reliably perform a lens protection function while enable the field of view with a simple operation during use.

It is a third object of the present invention to provide binoculars that reliably perform a lens protection function while affording a space saving feature and a high degree of design flexibility.

The binoculars of the present invention include a pair of lens barrels, each barrel having an optical system, a flexible lens barrier which travels between a protective position for protecting the optical system of each of the lens barrels and a position that is retracted from the field of view of the optical system, and a drive member for moving the flexible lens barrier between the protective position and the retracted position.

These objects and advantages of the present invention will become further apparent from the following detailed explanation.

DETAILED DESCRIPTION OF THE PREFERRED EMBODIMENTS

Referring to the drawings, the embodiments of the present invention are discussed.

Figure 1:
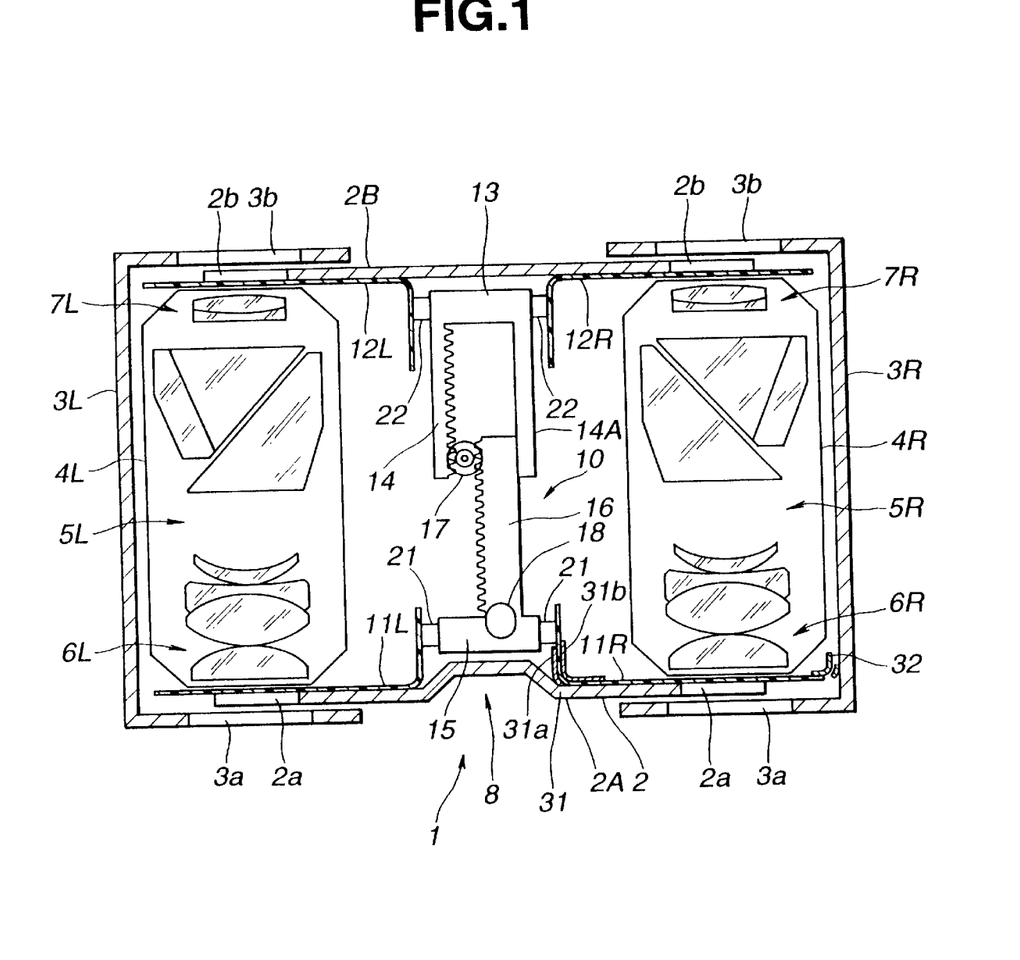
FIG. 1 is a longitudinal cross-sectional view showing internal critical components of binoculars of a first embodiment of the present invention in an operational state and with a lens barrier in a protective position, in which the top portion of the binoculars has been cut away.
Figure 2:
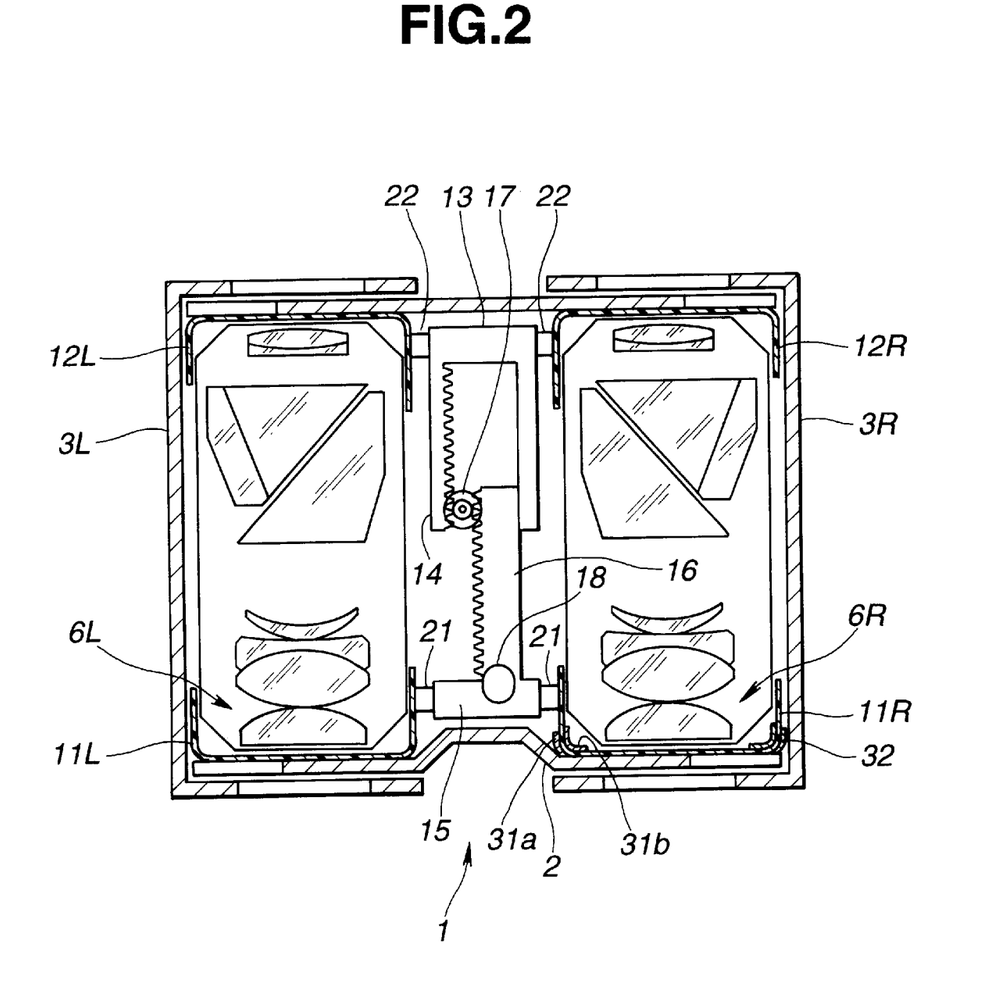
FIG. 2 is a longitudinal cross-sectional view showing the internal critical components of the binoculars of the first embodiment of the present invention in a closed state with the lens barrier in the protective position, in which the top portion of the binoculars has been cut away.
Figure 3:
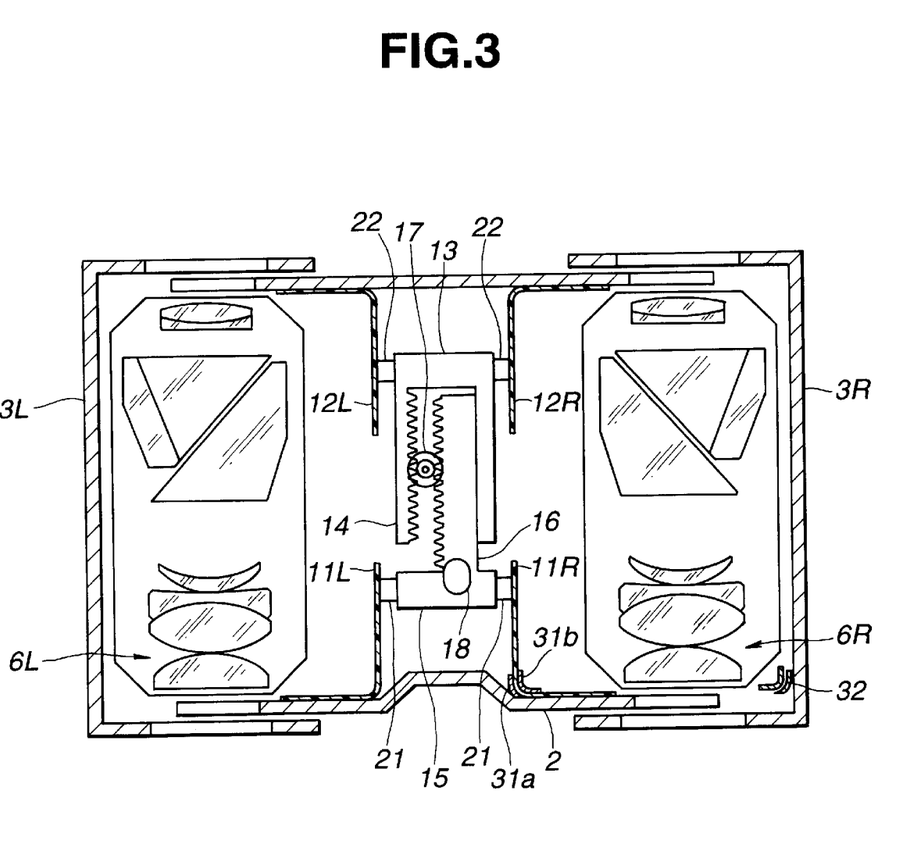
FIG. 3 is a longitudinal cross-sectional view showing the internal critical components of the binoculars of the first embodiment of the present invention in the operational state with the lens barrier in a retracted position, in which the top portion of the binoculars has been cut away.
Figure 4:
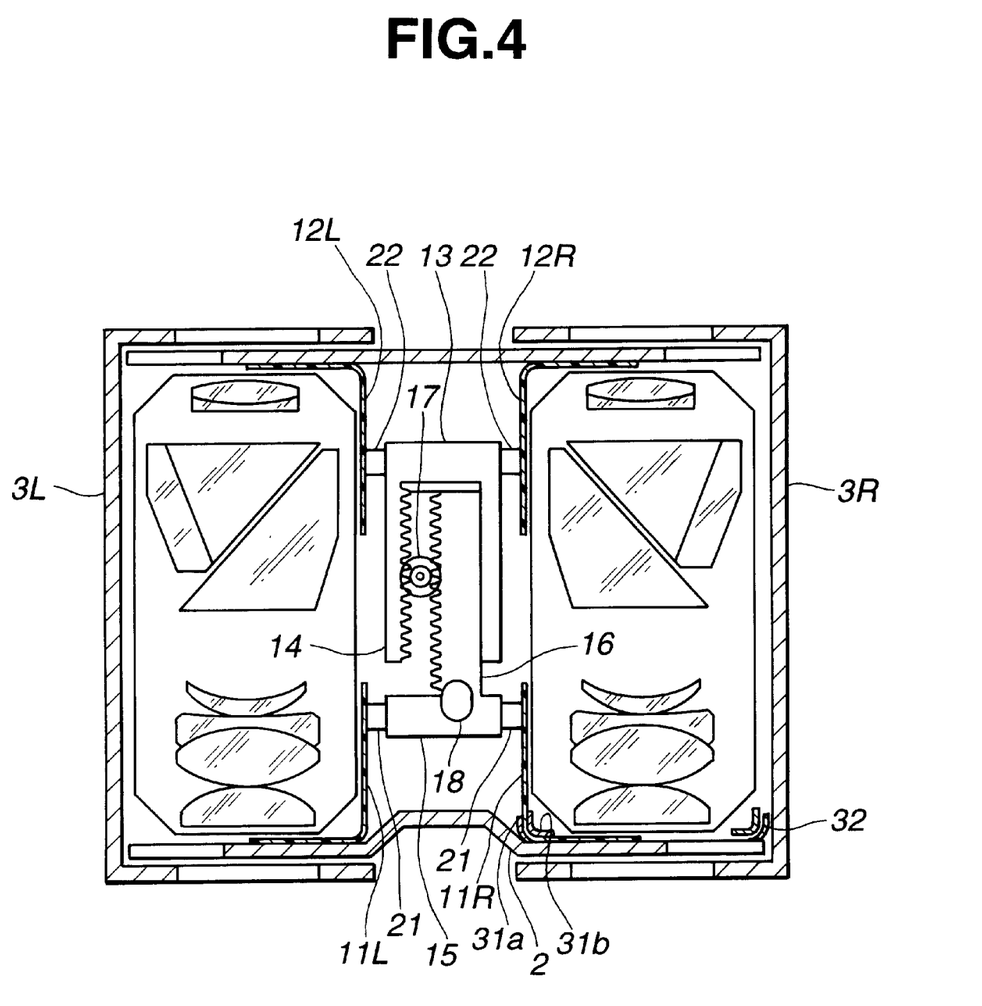
FIG. 4 is a longitudinal sectional view showing internal the critical components of the binoculars of the first embodiment of the present invention in the closed state with the lens barrier in the retracted position, with the top portion of the binoculars cut away.

FIG. 1, FIG. 2, FIG. 3 and FIG. 4 are longitudinal cross-sectional views showing internal critical components in binoculars of a first embodiment of the present invention, in which the top portion has been cut away. FIG. 1 shows the binoculars in a operational state with a lens barrier at a protective position. FIG. 2 shows the binoculars in a closed state with the lens barrier at the protective position. FIG. 3 shows the binoculars in the operational state with the lens barrier at a retracted position. FIG. 4 shows the binoculars in the closed state with the lens barrier at the retracted position.

FIG. 1 and FIG. 3 show the binoculars in the operational state with a pair of lens barrels at a minimum eye spacing position.

Referring to FIG. 1, the binoculars 1 of the first embodiment includes, as major components, a housing 2 serving as a frame for the binoculars; a pair of slidably movable external cases 3L and 3R symmetrically covering the housing 2 from both sides; a pair of lens barrels 4L and 4R respectively housed in the external cases 3L and 3R; optical systems 5L and 5R respectively arranged in the lens barrels 4L and 4R, wherein the optical system 5L is composed of a known eyepiece lens system 6L and an objective lens system 7L, and wherein the optical system 5R is composed of a known eyepiece lens system 6R and an objective lens system 7R; a pair of first and second lens barriers 11L and 11R respectively arranged in the vicinity of the eyepiece lens systems 6L and 6R for protecting the eyepiece lens systems 6L and 6R; a pair of third and fourth lens barriers 12L and 12R respectively arranged in the vicinity of the objective lens systems 7L and 7R for protecting the objective lens systems 7L and 7R; and a lens barrier position adjusting mechanism 10, arranged in the center of the housing 2, for controlling the position of the first and second lens barriers 11L and 11R and the third and fourth lens barriers 12L and 12R.

The housing 2 is also provided with a top covering and a bottom covering, not shown, serving as the external casing of the binoculars, and is also provided with a vertically extending eyepiece side wall 2A on the eyepiece side and a vertically extending objective side wall 2B on the objective side. A recess 8 is formed in the eyepiece lens side wall 2A to receive the nose of the user.

The eyepiece side wall 2A and the objective lens side wall 2B, on their portions respectively facing the eyepiece lens system 6L and 6R and the objective lens systems 7L and 7R, have respectively circular cutouts 2a and 2b to enable the fields of view of, at least, the optical systems during use.

Arranged on both sides of the housing 2 are external cases 3L and 3R, each having a C-shape in cross-section. The external cases 3L and 3R are slidably supported by the housing 2 while covering the housing 2 from both sides at the same time.

The external cases 3L and 3R, on their portions respectively facing the eyepiece lens systems 6L and 6R and the objective lens systems 7L and 7R, have respectively circular cutouts 3a and 3b to provide the fields of view of, at least the optical systems during use.

The cutouts 2a and 2b and the cutouts 3a and 3b are shaped so that the field of view of the optical systems is present throughout a range corresponding to a separation range of the lens barrels 4L and 4R from the minimum eye spacing position (as shown in FIG. 1) to a maximum eye spacing position (as extended further outwardly).

The lens barrels 4L and 4R are respectively integrated into the external cases 3L and 3R, and respectively include the eyepiece lens systems 6L and 6R and the objective lens systems 7L and 7R.

The first embodiment includes a lens barrier mechanism composed of the first and second lens barriers 11L and 11R and the third and fourth lens barriers 12L and 12R, for respectively protecting the eyepiece lens systems 6L and 6R and the objective lens systems 7L and 7R, and the lens barrier position adjusting mechanism 10 that allows the user to adjust the position of the lens barriers from outside the binoculars 1. The lens barrier mechanism will now be discussed in detail.

The first and second lens barriers 11L and 11R themselves are constructed of a flexible sheet material. The first and second lens barriers 11L and 11R respectively extend and move along passages that run in front of the eyepiece lens systems 6L and 6R and the external surface of the lens barrels 4L and 4R (on the eyepiece lens side). The passages will be discussed in more detail later.

Similarly, the third and fourth lens barriers 12L and 12R are constructed of a flexible sheet material. The third and fourth lens barriers 12L and 12R respectively extend and move along passages that run in front of the objective lens systems 7L and 7R and the external surface of the lens barrels 4L and 4R (on the objective lens side). The passages will be discussed in more detail later.

Each end (inward end into the binoculars 1) of the first and second lens barriers 11L and 11R and the third and fourth lens barriers 12L and 12R is connected to the respective shaft 21 and 22 of the lens barrier position adjusting mechanism 10. The first and second lens barriers 11L and 11R and the third and fourth lens barriers 12L and 12R are moved in response to the movement of the lens barrier position adjusting mechanism 10.

The lens barrier position adjusting mechanism 10 is arranged in the center of the housing 2, and includes reveral components. Specifically, the lens barrier position adjusting mechanism 10 includes a pinion-rack mechanism, composed of a first rack 16 that slides in parallel with the optical axis on the eyepiece lens side, a second rack 14 that slides in parallel with the optical axis on the objective lens side, and a pinion 17 which is rotatably supported in the housing 2 and is in mesh with the racks 14 and 16.

A knob 18 extends out of the top covering of housing 2 from the base portion 15 of the first rack 16 to be controllable by the user. A shaft 21 extends from both sides of the base portion 15 of the first rack 16.

A shaft 22 extends from both sides of a base portion 13 of the second rack 14. A guide portion 14A extends from the base portion 13 of the second rack 14 to guide the first rack 16 in its sliding movement.

The shafts 21 and 22 respectively extending from the base portions 15 and 13 are connected to the first and second lens barriers 11L and 11R and the third and fourth lens barriers 12L and 12R with predetermined connection means. The connection means will now be discussed referring to FIG. 6. Out of the four connection means, the connection means of the first lens barrier 11L and the shaft 21 is representatively discussed.

Figure 6:
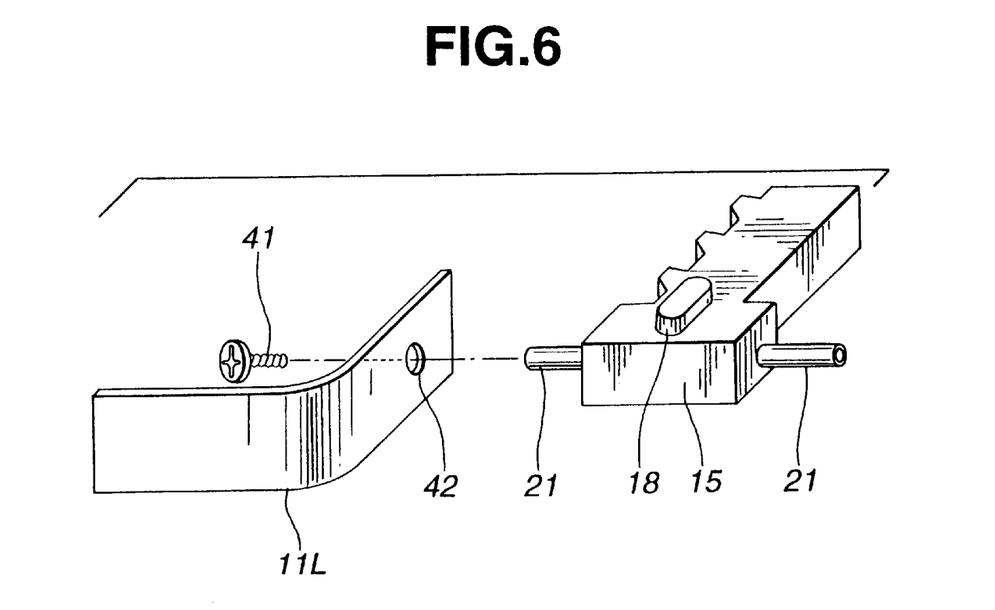
FIG. 6 is an enlarged perspective view showing connection means between a lens barrier position adjusting mechanism and the lens barrier in the binoculars of the first embodiment.

Referring to FIG. 6, a hole 42 is drilled in one end of the first lens barrier 11L, and the shaft 21, extending from the base portion 15 of the first rack 16, is inserted through the hole 42, and a screw 41 is screwed into the shaft 21 to fasten the first lens barrier 11L. In response to the sliding movement of the first rack 16 in the optical axis, the first lens barrier 11L is also moved.

The other lens barriers, not shown in FIG. 6, are connected to the shafts 21 and 22 using the same connection means. With these connection means, the first and second lens barriers 11L and 11R and the third and fourth lens barriers 12L and 12R are moved along with the sliding movement of the first rack 16 and the second rack 14.

The passages of the first and second lens barriers 11L and 11R and the third and fourth lens barriers 12L and 12R will now be discussed.

One end of each of the lens barriers is connected to a respective end of the shafts 21 and 22. Along with the movement of the lens barrier position adjusting mechanism 10, the lens barriers move. The end portion of the lens barriers connected to the adjustment mechanism 10 extends in parallel with the optical axis. The other end portion of each lens barrier is bent at about 90° relative to the former end portion through a guide 31 to be described later, thereby sliding in front of each of the eyepiece lens systems 6L and 6R and the objective lens system 7L and 7R.

The guide 31 will now be discussed.

Referring to FIG. 1, four guides 31 are arranged, two on the eyepiece lens side, slightly away from the center of the housing 2 and the other two on the objective lens side, slightly away from the center, for the first through fourth lens barriers 11L, 11R, 12L, and 12R to change the direction of each passage for the respective lens barrier by about 90°. Although the guide 31 is arranged for each lens barrier, the guide 31 for the second lens barrier 11R is representatively discussed for convenience of explanation. FIG. 1 shows only the guide 31 for the second lens barrier 11R. The guides for the remaining lens barriers, although present in the embodiment, are not shown.

Figure 5:
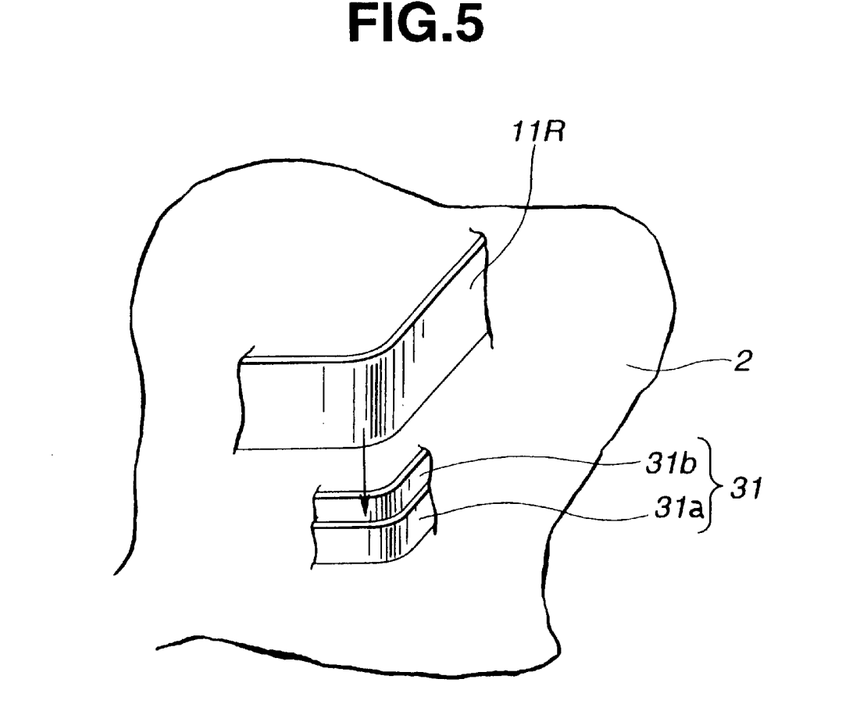
FIG. 5 is an enlarged perspective view showing an engagement of a guide section and the lens barrier in the binoculars of the first embodiment.

Referring to FIG. 5, the guide 31 is discussed. FIG. 5 shows only the guide 31 for the second lens barrier 11R. As shown, the guide 31 has guide walls 31a and 31b vertically extending from the bottom inner surface of the housing 2, and has an L shape in cross-section. A guide groove is thus formed between the guide walls 31a and 31b. The second lens barrier 11R is slidably routed through the groove. In this way, the passage of the lens barrier is changed in direction.

Although FIG. 5 shows only the guide 31 extending from the bottom inner surface of the housing 2, an identical guide is also arranged on the top inner surface of the housing 2. The other lens barriers, not shown in FIG. 5, are also guided through identical guides to change their passage direction.

Returning to FIG. 1, the passage of the lens barriers is further discussed below. The passage of the lens barrier is bent at about 90° by the guide 31, and then runs along the eyepiece side wall 2A or the objective side wall 2B, and then reaches the inner wall of each of the external cases 3L and 3R. A guide 32, identical to the guide 31, is formed at the inner wall of each of the external cases 3L and 3R. The passage of the lens barrier is bent by about 90° again. Although four guides 32 are employed, only the guide 32 for the second lens barrier 11R is representatively shown.

Guided by respective guides 31 and 32, the first and second lens barriers 11L and 11R and the third and fourth lens barriers 12L and 12R can be properly slid and positioned in front of the eyepiece lens systems 6L and 6R and the objective lens systems 7L and 7R to protect them.

Referring to FIG. 1 through FIG. 4, the operation of the first through fourth lens barriers and the lens barrier position adjusting mechanism 10 in the binoculars thus constructed will now be discussed.

When the binoculars 1 of the first embodiment is in the closed and non-operational state, the external cases 3L and 3R are closest to the center of the housing 2 as shown in FIG. 2. The lens barrels 4L and 4R are also in the closed state. The knob 18 is positioned toward the eyepiece lens side, and the first and second lens barriers 11L and 11R and the third and fourth lens barriers 12L and 12R are set to the protective position for covering the eyepiece lens systems 6L and 6R and the objective lens systems 7L and 7R. The ends of the lens barriers are bent by the guides 32 as they reach around the lens barrels 4L and 4R.

To use the binoculars, the user first slides sideways the external cases 3L and 3R to set the lens barrels 4L and 4R to the minimum eye spacing position as shown in FIG. 1. If the knob 18 is not operated, the first and second lens barriers 11L and 11R and the third and fourth lens barriers 12L and 12R are in the protective position, covering the eyepiece lens systems 6L and 6R and the objective lens systems 7L and 7R. Although the end of each lens barriers no longer extends through the guide 32, the lens barriers are still in the protective position, covering each lens. The eyepiece lens systems 6L and 6R and the objective lens systems 7L and 7R are reliably protected until the lens barrels 4L and 4R are put into the operational state.

To put the binoculars into the operational state, the user moves the knob 18 towards the objective lens side (see FIG. 3). The mechanism of the first rack 16, second rack 14, and pinion 17 works to move the shafts 21 and 22 closer to each other. The first and second lens barriers 11L and 11R and the third and fourth lens barriers 12L and 12R are drawn inwardly. Specifically, the lens barriers are retracted to the retracted position from the eyepiece lens systems 6L and 6R and the objective lens systems 7L and 7R. The fields of view through the eyepiece lens systems 6L and 6R and the objective lens systems 7L and 7R are exposed.

When the eye spacing adjustment is performed from the state shown in FIG. 3, the fields of view through the eyepiece lens systems 6L and 6R and the objective lens systems 7L and 7R are enabled throughout the adjustment range.

To close the binoculars 1 from the operational state shown in FIG. 3; the user moves the external cases 3L and 3R in a closing direction (see FIG. 4). By operating the knob 18, the user sets the first and second lens barriers 11L and 11R and the third and fourth lens barriers 12L and 12R to the protective position to protect the eyepiece lens systems 6L and 6R and the objective lens systems 7L and 7R.

In this embodiment, at least until the lens barrels 4L and 4R becomes operative, the eyepiece lens systems 6L and 6R and the objective lens system 7L and 7R are protected. During use, the fields of view through these optical systems are enabled. During non-operational periods, the lens barriers reliably protect the lens systems. The fields of view can be easily enabled or disabled as desired. This arrangement permits the user to comfortably use the binoculars.

The first and second lens barriers 11L and 11R and the third and fourth lens barriers 12L and 12R are constructed of a flexible material, and their passages are carefully guided. With this arrangement, the lens barriers require less space, permitting a compact design and a cost reduction of the binoculars.

A second embodiment of the present invention will now be discussed. The second embodiment is identical to the first embodiment in basic construction, and the only difference therebetween lies in the connection means employed between the lens barriers and the lens barrier position adjusting mechanism. To avoid redundancy, only the difference will be discussed.

Figure 7:
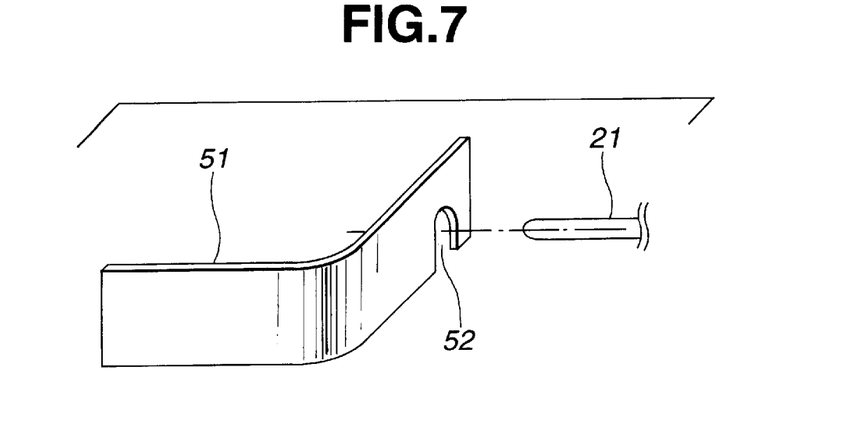
FIG. 7 is an enlarged perspective view showing an engagement of a lens barrier position adjusting mechanism and the lens barrier in binoculars of a second embodiment of the present invention.

FIG. 7 is an enlarged perspective view showing the engagement of the lens barrier with the shaft of the lens barrier position adjusting mechanism. FIG. 7 shows the lens barrier corresponding to the first lens barrier 11L.

As shown, the first lens barrier 51 of the second embodiment has a U-shaped notch 52. The shaft 21 extending from base 15 of the first rack 16 passes through the U-shaped notch 52. The lens barrier is thus slid in response to the movement of the first rack 16.

The rest of the construction and the operation of the second embodiment remain unchanged from those of the first embodiment. The second embodiment has the same advantages as the first embodiment.

A third embodiment of the present invention will now be discussed. The third embodiment is identical to the first embodiment in basic construction. The difference therebetween lies in that the third embodiment employs a plurality of connected planar members as each lens barrier. Only this difference will be discussed below.

Figure 8:
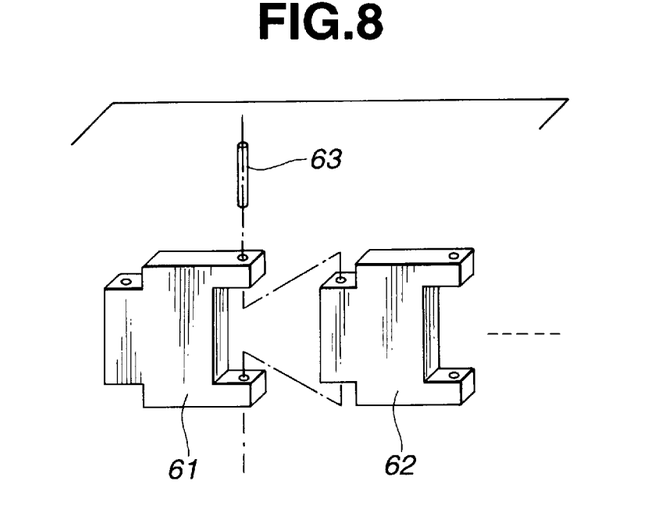
FIG. 8 is an enlarged exploded perspective view partly showing a lens barrier in binoculars of a third embodiment of the present invention.

FIG. 8 is an enlarged perspective view partly showing the lens barrier mechanism of the third embodiment. In the first embodiment, the lens barriers are constructed of as flexible sheet members. In the third embodiment, a plurality of planar members, planar members 61 and 62, for example, are pivotally connected about a shaft 63 (see FIG. 9). Similar planar members (not shown) are connected to the other ends of the planar members 61 and 62.

Figure 9:
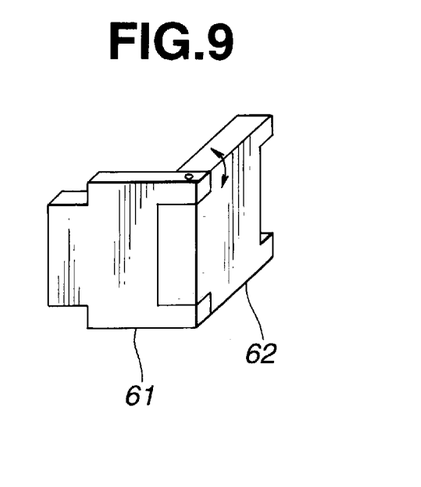
FIG. 9 is an enlarged perspective view partly showing the lens barrier mechanism in the binoculars of the third embodiment of the present invention.

The lens barriers thus constructed are also flexible like the lens barriers 11L, 11R, 12L, and 12R in the first embodiment.

The base portion of each lens barrier is connected to the lens barrier position adjusting mechanism 10. By operating the lens barrier position control mechanism 10, the lens barriers travel between the protective position and the retracted position, relative to the eyepiece lens systems 6L and 6R and the objective lens systems 7L and 7R.

The rest of the construction and the operation of the third embodiment remain unchanged from those of the first embodiment. The third embodiment have the same advantages as the first embodiment.

The binoculars of this invention reliably performs a lens protective function, enables the field of view with a simple operation, and presents a space-saving feature and permits a high degree of design flexibility.

In this invention, it is apparent that a wide variety of working modes can be formed on the basis of this disclosure without departing from the spirit and scope of the invention. This invention is not restricted by any specific embodiment herein except as limited by the appended claims.

What is claimed is:

1. Binoculars comprising:
 a pair of lens barrels, each barrel including an optical system having a field of view therethrough along an optical axis thereof; and
 a flexible lens barrier which flexes while traveling between a protective position for protecting the optical system of each of the lens barrels and a position that is retracted from the field of view of each optical system, so that the shape of each respective lens barrier varies between the protective position and the retracted position.

2. Binoculars according to claim 1, wherein the flexible lens barrier continuously slides both in a direction substantially parallel to the optical axes of the optical systems and in a direction perpendicular to the optical axes while traveling between the protective position and the retracted position.

3. Binoculars according to claim 2, wherein the flexible lens barrier is a sheet-like member.

4. Binoculars according to claim 2, wherein the flexible lens barrier comprises a plurality of planar members that are connected to each other so as to impart flexibility to the lens barrier.

5. Binoculars according to claim 1, wherein the flexible lens barrier is a sheet-like member.

6. Binoculars according to claim 1, wherein the lens barrier comprises a plurality of planar members that are connected to each other so as to impart flexibility to the lens barrier.

7. Binoculars comprising:
 a pair of lens barrels, each barrel including
 an optical system having a field of view therethrough along an optical axis thereof, and
 a pair of flexible lens barriers, each of which flexes while traveling between a protective position for protecting the optical system of each of the lens barrels and a position that is retracted from the field of view of each optical system, so that the shape of each respective lens barrier varies between the protective position and the retracted position; and
 a drive member for moving the flexible lens barrier between the protective position and the retracted position.

8. Binoculars according to claim 7, wherein the flexible lens barrier is slidable both in a direction substantially parallel to the optical axis of each optical system and in a direction perpendicular to the optical axes.

9. Binoculars according to claim 8, wherein the flexible lens barrier is a sheet-like member.

10. Binoculars according to claim 8, wherein the flexible lens barrier comprises a plurality of planar members that are connected to each other so as to impart flexibility to the lens barrier.

11. Binoculars according to claim 7, wherein the flexible lens barrier is a sheet-like member.

12. Binoculars according to claim 7, wherein the lens barrier comprises a plurality of planar members that are connected to each other so as to impart flexibility to the lens barrier.

13. Binoculars according to claim 7, wherein the drive member comprises:

an operation member to be manually driven by a user; and a flexible lens barrier adjusting mechanism for adjusting the position of the flexible lens barrier relative to the optical system in each lens barrel in response to operation of the operation member.

14. Binoculars comprising:

a pair of lens barrels, each barrel including an optical system having a field of view therethrough along an optical axis thereof; and in each of the lens barrels, a pair of flexible lens barriers, each of which flexes while traveling along a non-linear passage, for setting a protective state for protecting the optical system of the pair of lens barrels and an observation state in which observation can be carried out through the optical system, so that the shape of each respective lens barrier varies between the protective state and the observation state.

15. Binoculars according to claim 14, wherein the passage of the flexible lens barrier includes at least one curved portion.

16. Binoculars according to claim 15, further comprising, at the at least one curved portion, a pair of guide walls between which the flexible lens barrier can travel.

17. Binoculars according to claim 14, wherein the passage along which the flexible lens barrier travels includes one portion extending in a direction substantially parallel to the optical axis of each optical system and another portion extending in a direction perpendicular to the optical axes.

* * * * *